(12) United States Patent
Miette et al.

(10) Patent No.: US 10,744,536 B2
(45) Date of Patent: Aug. 18, 2020

(54) EQUIPMENT FOR AUTOMATICALLY SORTING NON-STANDARD PARCELS

(71) Applicant: SOLYSTIC, Bagneux (FR)

(72) Inventors: Emmanuel Miette, Saint Gratien (FR); Luc Chirol, Paris (FR)

(73) Assignee: SOLYSTIC (FR)

( * ) Notice: Subject to any disclaimer, the term of this patent is extended or adjusted under 35 U.S.C. 154(b) by 319 days.

(21) Appl. No.: 15/750,621

(22) PCT Filed: Nov. 3, 2017

(86) PCT No.: PCT/FR2017/053017
§ 371 (c)(1),
(2) Date: Feb. 6, 2018

(87) PCT Pub. No.: WO2018/115609
PCT Pub. Date: Jun. 28, 2018

(65) Prior Publication Data
US 2020/0086352 A1    Mar. 19, 2020

(30) Foreign Application Priority Data
Dec. 22, 2016   (FR) ...................................... 16 63103

(51) Int. Cl.
*B07C 3/08*       (2006.01)
*B65G 47/44*      (2006.01)
*B65G 37/02*      (2006.01)

(52) U.S. Cl.
CPC .............. *B07C 3/087* (2013.01); *B65G 37/02* (2013.01); *B65G 47/44* (2013.01); *B65G 2201/0285* (2013.01)

(58) Field of Classification Search
CPC .... B07C 3/02; B07C 3/06; B07C 3/08; B07C 3/087; B65G 37/02; B65G 47/44; B65G 47/46–506; B65G 47/96–965; B65G 2201/0285
See application file for complete search history.

(56) References Cited

U.S. PATENT DOCUMENTS

| 5,990,437 A | 11/1999 | Coutant et al. |
| 6,533,099 B2 * | 3/2003 | Bonham ................ B65G 47/44 198/360 |

(Continued)

FOREIGN PATENT DOCUMENTS

| WO | 2014/057182 A1 | 4/2014 |
| WO | 2016/067163 A1 | 5/2016 |

*Primary Examiner* — Gene O Crawford
*Assistant Examiner* — Keith R Campbell
(74) *Attorney, Agent, or Firm* — Ware, Fressola, Maguire & Barber LLP

(57) ABSTRACT

Equipment for sorting parcels in a logistics center, the equipment comprising an automated sorting conveyor mounted at a height over a platform and with sorting outlets equipped with sorting chutes in the form of ramps sloping downwards from respective sorting outlets of the conveyor to the platform below the conveyor, and shuttle trolleys mounted on wheels and for automatically moving non-standard parcels that cannot be machine-sorted on the sorting conveyor, the shuttle trolleys travelling along travel aisles passing under the ramps so as to optimize the footprint of the equipment.

12 Claims, 2 Drawing Sheets

(56) References Cited

U.S. PATENT DOCUMENTS

| | | | | |
|---|---|---|---|---|
| 8,919,529 B1* | 12/2014 | Erceg | ............... | B65G 47/962 |
| | | | | 198/360 |
| 9,981,291 B2* | 5/2018 | Chirol | ............... | B07C 3/008 |
| 10,226,794 B2* | 3/2019 | Vegh | ............... | B07C 3/006 |
| 10,301,122 B2* | 5/2019 | Moroni | ............... | B07C 1/06 |
| 2015/0235165 A1* | 8/2015 | Miette | ............... | G06Q 10/083 |
| | | | | 705/337 |
| 2018/0333750 A1* | 11/2018 | Miette | ............... | B07C 3/02 |

\* cited by examiner

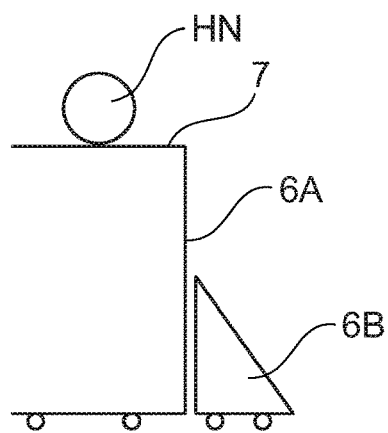
Fig. 3
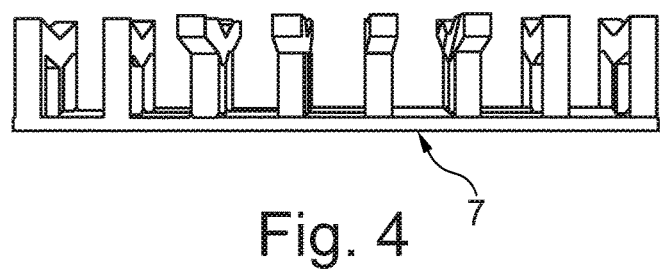
Fig. 4
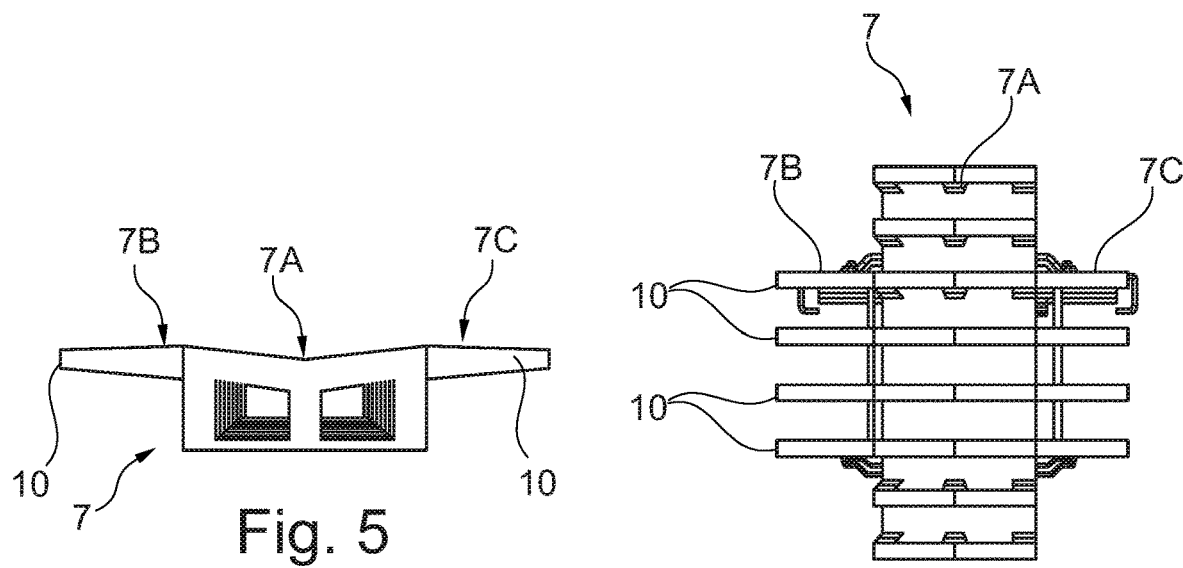
Fig. 5
Fig. 6

EQUIPMENT FOR AUTOMATICALLY SORTING NON-STANDARD PARCELS

CROSS REFERENCE TO RELATED APPLICATIONS

This application is the U.S. National Stage of International Application Number PCT/FR2017/053017 filed on Nov. 3, 2017, which application claims priority under 35 USC § 119 to French Patent Application No. 1663103 filed on Dec. 22, 2016. Both applications are hereby incorporated by reference in their entirety.

TECHNICAL FIELD

The invention relates to the field of parcel-handling logistics centers in which parcels are received, sorted, and consolidated into groups with a view to being delivered.

PRIOR ART

In particular, the invention relates to equipment for sorting parcels in a logistics center such as the equipment described in Document US 8 919 529 B1 that comprises an automated sorting conveyor that can be controlled by a monitoring and control unit to move parcels in series past sorting outlets, and to direct each parcel towards a certain sorting outlet as a function of sorting information associated with said parcel and that has been recognized by said monitoring and control unit.

Such a conveyor may be mounted at a height over a platform. Each sorting outlet may be equipped with a sorting chute that is in the form of a ramp sloping downwards from the sorting outlet of the conveyor to the platform below the sorting conveyor.

The parcel conveyors that are used in such logistics centers are highly sophisticated machines for handling a broad spectrum of parcels. They may be roller conveyors, belt conveyors, or any other type of conveyor.

The parcels are generally packets, i.e. of rectangular block shape, and a delivery address for the parcel is placed on one face of the rectangular block and serves for the sorting process. For example, a digital image of said delivery address may be formed using a handheld scanner and it may be sent to the data processor unit for automatic recognition and for identifying a sorting outlet that corresponds to said delivery address in the automatic sorting process. A sorting code in the form of a bar code may also be placed on one face of the parcel.

However, some parcels to be sorted cannot be handled automatically by such automatic sorting conveyors because of their size, shape, or weight that are incompatible with the operating characteristics of such conveyors.

Such parcels may be referred to as "non-standard parcels". For example, such a parcel may be a rug rolled up in the shape of a long cylinder, or indeed a rigid slab of large dimensions.

The quantity of non-standard parcels to be handled in a logistics enter can represent a proportion of about 10% of the parcels for machine sorting that go through the automatic sorting conveyor.

Currently, such non-standard parcels are essentially handled manually. The operatives in charge of handling such non-standard parcels in a logistics center have to pick them up from a loading point and move them to an unloading or drop-off point, e.g. in the vicinity of a sorting outlet, which is arduous, in particular if the parcels are heavy and bulky.

In addition, such non-standard parcels that are handled manually cannot, in real time, follow any reorganization of the parcel sorting plan. They therefore follow a sorting process that can be different from the sorting process of the machine-sortable parcels.

SUMMARY OF THE INVENTION

An object of the invention is therefore to remedy those various drawbacks.

To this end, the invention provides equipment for sorting parcels in a logistics center, said equipment comprising an automated sorting conveyor mounted at a height over a platform and with sorting outlets equipped with sorting chutes in the form of ramps sloping downwards from respective sorting outlets to the platform below, the equipment further comprising at least one shuttle trolley mounted on wheels and suitable for transporting non-standard parcels that are not machine-sortable on the sorting conveyor, said equipment being characterized in that the shuttle trolley is controlled so as to move a non-standard parcel from a loading point to an unloading point while passing under the ramps.

More particularly, in accordance with the invention, said platform of the logistics center has a first travel aisle for the shuttle trolley that extends alongside the sorting conveyor and under the sorting chutes, and a second travel aisle for the shuttle trolley that extends parallel to the first travel aisle, said second travel aisle being disposed between the sorting conveyor and said first travel aisle under the sorting chutes in such a manner that since the first travel aisle has less headroom under the sorting outlet ramps than the second travel aisle, the movement of the shuttle trolley from a loading point at which a parcel is loaded onto the empty shuttle trolley and an unloading point at which said parcel is unloaded from said shuttle trolley and from which said shuttle trolley returns empty is organized in such a manner that said shuttle trolley loaded with the non-standard parcel follows said second travel aisle to reach said unloading point, and said shuttle trolley that returns empty follows said first travel aisle to reach said loading point.

In accordance with a feature of the equipment of the invention, said platform of the logistics center may have cross-aisles along which the shuttle trolley can travel, said cross-aisles crossing said travel aisles and extending under the sorting chutes.

The underlying idea of the invention is thus to automate the sorting of non-standard parcels using shuttle trolleys that travel through zones of the platform that are not readily accessible for the operatives, and thus that are under-used, so as to optimize the footprint of the sorting equipment.

The term "shuttle trolley" is used to mean a trolley mounted on wheels and provided with an upper deck adapted to carry a single parcel, the trolley being moved on the floor by a motor-driven shuttle robot that moves in self-propelled and independent manner, as presented in Patent Document WO 2014/057182.

In accordance with the invention, the unencrypted recipient address on a non-standard parcel, or indeed a sorting indication corresponding to said recipient address, e.g. in the form of a bar code, may be input on loading the parcel onto the shuttle trolley, e.g. by a camera that takes a digital image of the recipient address or of the bar code, said image then being transmitted to the monitoring and control unit for automatic recognition and for use for automatically sorting said non-standard parcel among the machine-sortable other parcels.

The equipment of the invention may advantageously also have the following features:

the shuttle trolley comprises firstly a trolley mounted on wheels and having a deck adapted to carry a non-standard parcel, and secondly a motor-driven shuttle robot adapted to dock with said trolley and to move it;

the trolley mounted on wheels may be provided with a deck for carrying a non-standard parcel, which deck has a central portion in the shape of a trough of V-shaped cross-section, and two side portions on either side of the central portion and that extend in a common horizontal plane; and the body of the deck may be formed by two combs disposed back-to-back, the teeth of the combs extending parallel to one another from the central portion of the body to the edges of respective ones of the side portions.

BRIEF DESCRIPTION OF THE DRAWINGS

The present invention can be better understood and other advantages appear on reading the following detailed description of an embodiment given by way of non-limiting example and with reference to the accompanying drawings, in which:

FIG. 3 shows a shuttle robot with a trolley mounted on wheels;

FIG. 4 is a diagrammatic side view of the deck of the trolley mounted on wheels;

FIG. 5 is a diagrammatic front view of the deck of the trolley mounted on wheels; and FIG. 6 is a diagrammatic plan view of the deck of the trolley mounted on wheels.

DESCRIPTION OF EMBODIMENTS

Figure 1:
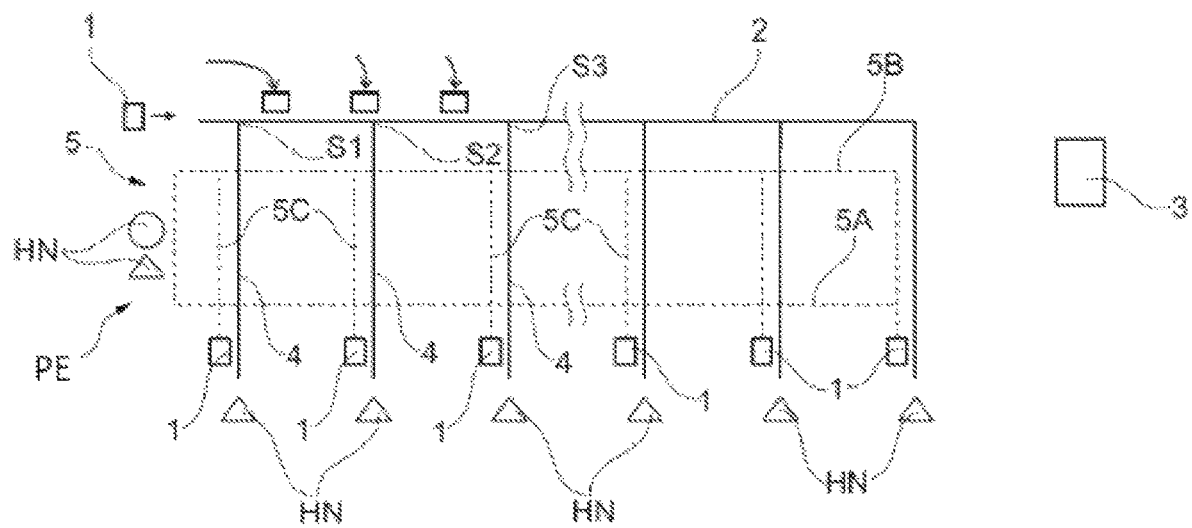
FIG. 1 is a diagrammatic plan view of the platform of a parcel-sorting logistics center.

FIG. 1 is a highly diagrammatic view showing the topology of a logistics center for sorting parcels 1 with a sorting conveyor 2 and sorting outlets, such as S1, S2, S3.

A small number of sorting outlets are shown even though the conveyor may serve several tens or indeed hundreds of sorting outlets.

The sorting conveyor may be a belt conveyor, a roller conveyor, or some other type of conveyor, and, in this example, it is fed with machine-sortable parcels from one of its ends (on the left of FIG. 1), on which conveyor the parcels 1 are moved in series and flat.

The sorting conveyor is controlled by a monitoring and control unit 3 adapted for automatically recognizing the recipient address of a parcel and, as a function of a sorting plan, for directing the parcel to the corresponding sorting outlet for sorting said parcel.

Automatic address recognition may be performed, for example, from a digital image of the recipient address on the parcel 1, which image is taken at the time the parcel 1 is fed onto the sorting conveyor 2.

Figure 2:
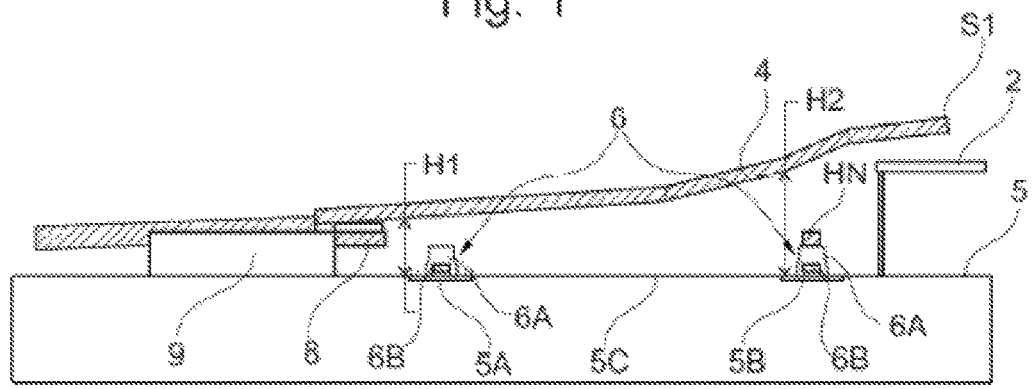
FIG. 2 is a diagrammatic section view of the platform of FIG. 1.

As shown in FIGS. 1 and 2, the sorting conveyor 2 is, in this example, mounted at a height over the platform 5 of the logistics center, and each sorting outlet such as S1 is provided with a sorting chute 4 in the form of a ramp sloping downwards from the sorting outlet S1 of the sorting conveyor to the platform below the sorting conveyor.

The sorting equipment of the invention is designed to sort, at a reduced throughput rate, parcels that are not machine-sortable, that are referred to as "non-standard parcels" HN, and that are each shown in FIG. 1 by a triangle and a circle, unlike the machine-sortable parcels 1, which are each represented by a rectangle. Said non-standard parcels HN are, for example, parcels that are of shape, weight, or dimensions incompatible with the operating characteristics of the conveyor 2. Such non-standard parcels may be cylinders, slabs, rolls, etc.

The non-standard parcels HN that reach the inlet point PE of the logistics center (on the left in FIG. 1) are, in this example, loaded one-by-one by an operative onto a shuttle trolley 6.

The recipient address of the non-standard parcel may be scanned by the operative and sent to the monitoring and control unit 3 for automatically determining a corresponding sorting outlet following a sorting plan for sorting the machine-sortable parcels.

Whereupon the monitoring and control unit is suitable for remotely controlling the shuttle trolley 6 loaded with the non-standard parcel HN so as to cause it to move on the platform 5 and so as to direct it towards the sorting outlet of the sorting conveyor that corresponds to said recipient address in the sorting plan for sorting the machine-sortable parcels.

More particularly, in accordance with the invention and as shown in FIGS. 1 and 2, the platform 5 of the logistics center has a first travel aisle 5A for the shuttle trolleys 6 that extends alongside the sorting conveyor 2 while passing under the sorting chutes 4, and a second travel aisle 5B for the shuttle trolleys 6 that is parallel to the first travel aisle 5A. As shown in FIG. 1, the travel aisles 5A, 5B pass under the sorting chutes substantially perpendicularly thereto.

The travel aisle 5B is disposed between the sorting conveyor 2 and the travel aisle 5A, under the sorting chutes, in such a manner that the travel aisle 5A has less headroom H1 under the sorting outlet ramps than the travel aisle 5B, the headroom of the travel aisle 5B under the ramp being indicated by H2.

In accordance with the invention, the monitoring and control unit 3 is arranged to cause the shuttle trolleys 6 to move along the travel aisles 5A and 5B between the loading station at the inlet PE of the logistics center, where a parcel is loaded onto an empty shuttle trolley, and an unloading point, which, in this example, is at the free end of a sorting chute 4, where the parcel is unloaded from the shuttle trolley 6, which then returns empty to the loading point at the inlet PE.

More particularly, the movement of the shuttle trolleys 6 is controlled in such a manner that the shuttle robot 6 loaded with a non-standard parcel HN follows the travel aisle 5B where there is more headroom H2 under the ramp to reach the sorting outlet, and in such a manner that the shuttle robot that returns empty follows the travel aisle 5A having less headroom H1 under the ramp to reach the loading point at the inlet PE.

As can be seen in FIG. 1, the two travel aisles are crossed by cross-aisles 5C followed both on the go routes and on the return routes by the shuttle trolleys 6, thereby allowing the shuttle trolleys to travel along optimized routes on the platform 5. FIG. 1 shows said cross-aisles 5C in dashed lines extending alongside the sorting chutes, but it should be considered that, in accordance with the invention, said cross-aisles 5C extend under the sorting chutes in order to optimize the footprint of the equipment.

By way of example, to go towards the sorting chute of the sorting outlet S3, the shuttle trolley follows the aisle 5B alongside the conveyor 2 to the outlet S3, and then turns through 90° and goes along and under the chute from the outlet S3 along the cross-aisle 5C to an unloading point at which the non-standard parcel is unloaded by an operative or automatically.

Then, the empty shuttle trolley 6 goes back up the cross-aisle 5C, and then turns through 90° to go back up the travel aisle 5A to the inlet point PE where it can, once again, be loaded with a non-standard parcel HN.

This arrangement of the invention contributes to automating the sorting of non-standard parcels, while also optimizing the footprint occupied by the sorting equipment in the logistics center.

FIG. 2 is a longitudinal section view of FIG. 1, along a sorting chute.

The travel aisles 5A, 5B, and 5C are shown in FIG. 2.

FIG. 2 is a highly diagrammatic view of a shuttle trolley 6 placed on the travel aisle 5B and loaded with a non-standard parcel HN.

On the travel aisle 5A, another shuttle trolley 6 is shown without a non-standard parcel. In accordance with the invention, a plurality of shuttle trolleys can travel at the same time along the travel aisles 5A, 5B, and 5C of the platform of the logistics center so as to increase the handling throughput rate of the non-standard parcels using the shuttle trolleys 6.

A shuttle trolley of the invention may comprise a trolley mounted on wheels that is indicated by 6A in FIGS. 2 and 3 and that is provided with a deck 7 adapted to support a non-standard parcel HN, and a shuttle robot mounted on motor-driven wheels 6B that is adapted to move on the floor of the platform by being remotely controlled in wireless manner by the monitoring and control unit 5.

An embodiment of a shuttle robot adapted for a trolley mounted on wheels is described more particularly in Patent Document WO 2014/057182. In that document, it is indicated how the shuttle robot is adapted to dock with the trolley mounted on wheels in such a manner as to move it on the platform 5 and also as to separate from said trolley mounted on wheels in such a manner as to leave it where it is.

The deck 7 of the shuttle trolley is shown in more detail in FIGS. 4 to 6.

As shown in these figures, the deck 7 has a shape designed to carry different non-standard parcels of different shapes: elongate cylinders or cylinders of large diameters, slabs, rectangular blocks, etc.

The deck 7 includes a central portion 7A in the shape of a trough of V-shaped cross-section and two side portions 7B, 7C on either side of the central portion and that extend in a common horizontal plane. The trough-shaped central portion 7A is adapted to carry cylindrical parcels. The two plane side portions 7B, 7C are adapted to carry flat parcels of large dimensions.

The trough of the central portion 7A is disposed below the horizontal plane of the side portions 7B, 7C so that a flat parcel of large size resting on the plane of the side portions straddles the trough of the central portion.

As can be seen more particularly in FIGS. 4 and 6, the bodies of the central and side portions 7A, 7B, 7C comprise parallel framework members forming two combs 10 disposed back-to-back, the teeth of the combs 10 extending parallel to one another from the central portion 7A to the edges of respective ones of the side portions 7B, 7C.

The body of the central portion 7A may have a structure with holes through it as shown in FIG. 5.

The teeth of the comb may be shorter at the ends than in the middle, as can be seen in FIG. 6.

In FIG. 6, on either side, the deck has eight comb teeth, the four middle ones of which are of longer length. Said longer comb teeth define the horizontal planes of the side portions.

At the end of each of the chutes 4, a roller conveyor may be provided, as shown by reference 8 in FIG. 2, for receiving the non-standard parcels that are unloaded from the shuttle trolleys and that feed a storage bin 9 disposed at the end of the sorting chute 4 for also receiving the machine-sortable parcels 1 brought by said sorting chute 4.

In the storage bin 9, the machine-sortable parcels and the non-standard parcels are therefore consolidated so as to be loaded together onto the corresponding truck, thereby making it possible to rationalize the handling of the parcels at the outlet of the logistics center.

The invention claimed is:

1. An equipment for sorting parcels in a logistics center, said equipment comprising an automated sorting conveyor mounted at a height over a platform and with sorting outlets equipped with sorting chutes in the form of ramps sloping downwards from the respective sorting outlets to the platform below, the equipment further comprising at least one shuttle trolley mounted on wheels and suitable for transporting non-standard parcels that are not machine-sortable on the sorting conveyor, wherein the shuttle trolley is controlled so as to move a non-standard parcel from a loading point to an unloading point while passing under the ramps.

2. The equipment according to claim 1, wherein said platform of the logistics center has a first travel aisle for the shuttle trolley that extends alongside the sorting conveyor and under the sorting chutes, and a second travel aisle for the shuttle trolley that extends parallel to the first travel aisle, said second travel aisle being disposed between the sorting conveyor and said first travel aisle under the sorting chutes in such a manner that since the first travel aisle has less headroom under the sorting outlet ramps than the second travel aisle, the movement of the shuttle trolley from a loading point at which a parcel is loaded onto the empty shuttle trolley and an unloading point at which said parcel is unloaded from said shuttle trolley and from which said shuttle trolley returns empty is organized in such a manner that said shuttle trolley loaded with the non-standard parcel follows said second travel aisle to reach said unloading point, and said shuttle trolley that returns empty follows said first travel aisle to reach said loading point.

3. The equipment according to claim 2, wherein said platform of the logistics center has cross-aisles along which the shuttle trolley can travel, said cross-aisles crossing said travel aisles and extending under the sorting chutes.

4. The equipment according to claim 3, wherein the shuttle trolley comprises firstly a trolley mounted on wheels and having a deck configured to carry a non-standard parcel (HN), and secondly a motor-driven shuttle robot configured to dock with said trolley and to move said trolley.

5. The equipment according to claim 4, wherein the trolley mounted on wheels is provided with the deck for carrying a non-standard parcel, the deck has a central portion in the shape of a trough of V-shaped cross-section, and two side portions on either side of the central portion and that extend in a common horizontal plane.

6. The equipment according to claim 5, wherein the deck comprises a body having framework members forming two combs disposed back-to-back, wherein teeth of the combs extend parallel to one another from the central portion of said body to the edges of respective ones of the side portions.

7. The equipment according to claim 2, wherein the shuttle trolley comprises firstly a trolley mounted on wheels and having a deck configured to carry a non-standard parcel (HN), and secondly a motor-driven shuttle robot configured to dock with said trolley and to move said trolley.

8. The equipment according to claim 2, wherein the shuttle trolley mounted on wheels is provided with a deck for carrying a non-standard parcel, the deck has a central portion in the shape of a trough of V-shaped cross-section, and two side portions on either side of the central portion and that extend in a common horizontal plane.

9. The equipment according to claim 8, wherein the deck comprises a body having framework members forming two combs disposed back-to-back, wherein teeth of the combs extend parallel to one another from the central portion of said body to the edges of respective ones of the side portions.

10. The equipment according to claim 1, wherein the shuttle trolley comprises firstly a trolley mounted on wheels and having a deck configured to carry a non- standard parcel (HN), and secondly a motor-driven shuttle robot configured to dock with said trolley and to move said trolley.

11. The equipment according to claim 1, wherein the shuttle trolley mounted on wheels is provided with a deck for carrying a non-standard parcel, the deck has a central portion in the shape of a trough of V-shaped cross-section, and two side portions on either side of the central portion and that extend in a common horizontal plane.

12. The equipment according to claim 11, wherein the deck comprises a body having framework members forming two combs disposed back-to-back, wherein teeth of the combs extend parallel to one another from the central portion of said body to the edges of respective ones of the side portions.

* * * * *